July 13, 1937.  H. H. HOLLENWEGER  2,086,978
EXTENSIBLE ELECTRIC CORD
Filed Sept. 28, 1935
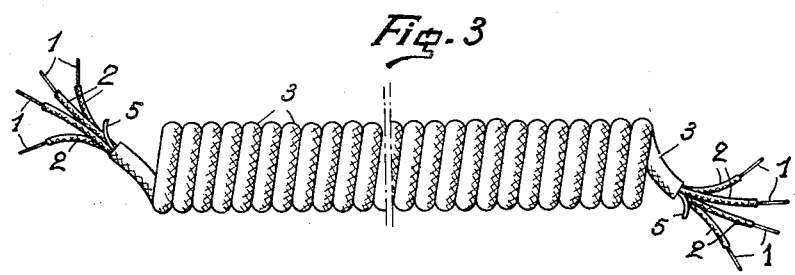
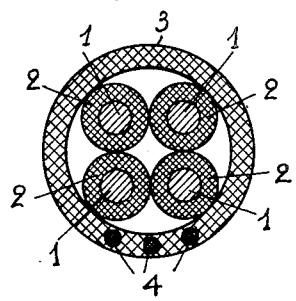
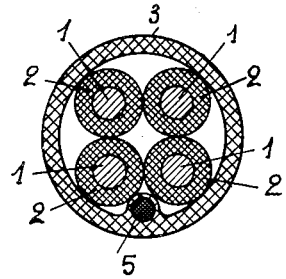

Patented July 13, 1937

2,086,978

UNITED STATES PATENT OFFICE 2,086,978

EXTENSIBLE ELECTRIC CORD

Hans Heinrich Hollenweger, Zofingue, Switzerland, assignor to Herman Arthur Ungemuth, Paris, France Application September 28, 1935, Serial No. 42,600
In Switzerland August 6, 1935

3 Claims. (Cl. 173—367)

This invention relates to extensible electrical cords and has for its object the provision of an improved cord of this character. The electrical cord of the invention comprises one or more conducting wires or strands, preferably each covered with a suitable insulating material and a braid of woven material over the insulating material in which is woven one or more threads of rubber running in the lengthwise direction of the cord. These rubber threads are eccentrically arranged with respect to the cord as a whole, and when a force is applied to the cord extending it, the rubber threads are placed under tension and, upon release of the force, the threads cause the cord to assume a spiral shape.

In this cord the conductor and the insulation of the separate strands do not move relatively to each other, so that there is no friction and wear of the separate conducting strands which, in particular in cords for current of low intensity, are thin metal strands, and therefore the life of the cord is greater than with the extensible cords known hitherto. Furthermore, in this case the separate strands do not require to be very flexible, so that more suitable insulating materials can be used for same, whereby an even greater insulating resistance than in the usual non-extensible cords can be obtained between the separate strands.

In the drawing two embodiments of the object of the invention are shown:

Fig. 1 shows a section through a cord according to a first embodiment.

Fig. 2 shows a section of another embodiment, and

Fig. 3 shows an elevation of the cord according to Fig. 2.

According to Fig. 1, the cord has four strands 1, which each have an insulating casing 2. The bundle of strands formed by the four strands is provided with a braid 3 in which are woven three rubber threads 4 running in the lengthwise direction of the cord, which cause the finished cord to take up a spiral shape.

According to Figs. 2 and 3, instead of three, only one rubber thread 5 is woven in the braid 3. Fig. 3 shows the finished cord, in which the rubber thread is on the inside of the spiral.

According to the number and arrangement of the rubber threads, the diameter of the convolutions of the spiral is greater or smaller. Consequently, for cords for current of low intensity small diameter convolutions can be used and for cords for current of high intensity greater diameters can be used.

I claim:

1. An extensible electrical cord comprising a conducting wire, an insulating covering surrounding the wire, a braid of woven material surrounding the insulated wire, and at least one thread of resilient material interwoven into the braid along one side thereof, said thread being under tension when the cord is extended, thereby causing the cord to assume a spiral shape upon release of the tension.

2. An extensible electrical cord comprising a conducting wire, an insulating covering surrounding the wire, a fabric covering woven over the insulated wire, and at least one rubber thread running in the lengthwise direction of the cord, said rubber thread being interlockingly held in the fabric at one side of said covering and under sufficient tension when the cord is extended to cause the cord to assume a spiral shape when the force causing the tension is released.

3. An extensible electrical cord comprising a plurality of separate conductors, insulating material surrounding each conductor, a braid of woven material surrounding the insulated conductors, and a plurality of rubber threads arranged in a group at one side of the cord interwoven into the braid and running in the lengthwise direction of the cord, said threads being under tension when the cord is extended, thereby causing the cord to assume a spiral shape upon release of the tension.

HANS HEINRICH HOLLENWEGER.